March 23, 1965 J. C. SLONCZEWSKI 3,175,201
MAGNETIC STORAGE ELEMENTS
Filed Feb. 26, 1962

INVENTOR
JOHN C. SLONCZEWSKI
BY [signature]
ATTORNEY

Patented Mar. 23, 1965

3,175,201

MAGNETIC STORAGE ELEMENTS

John C. Slonczewski, Katonah, N.Y., assignor to International Business Machines Corporation, New York, N.Y., a corporation of New York Filed Feb. 26, 1962, Ser. No. 175,603
14 Claims. (Cl. 340—174)

Figure 1:
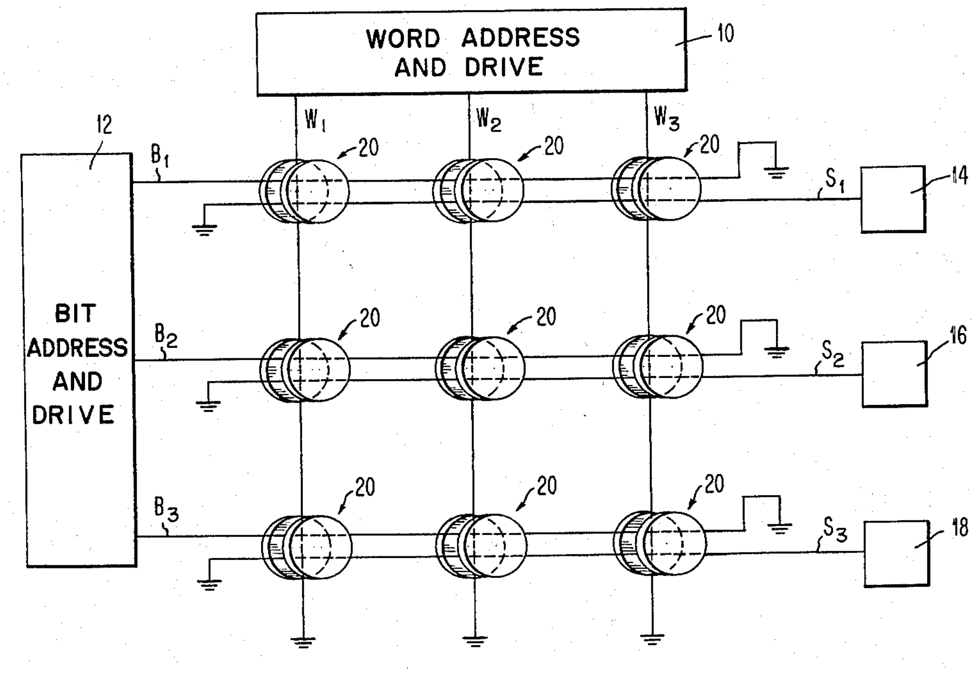

The present invention relates to a biaxial anisotropic magnetic memory element and to memory arrays made therefrom and more particularly to such an element composed of two uniaxial anisotropic elements.

The capabilities of computing machines have increased by several factors of ten since the first large-scale digital computing systems were introduced for the solution of scientific problems only twenty years ago. The speeds of these early machines were limited by mechanical motions involved in input-output operations and by the electromechanical devices used in performing arithmetic, storage and transfer operations. Simple operations of addition and subtraction required more than 0.1 second. The first truly high speed computers began to evolve when relays were replaced by vacuum tubes in the late 1940's. The replacement of vacuum tubes in the 1950's by solid state devices such as transistors, ferrite cores, magnetic tape, etc., have brought further advances in speed and reliability. Addition and subtraction can now be performed in less than one millionth of a second, and the improvement over the electromechanical machines is even more striking when complex operations such as matrix inversion are considered.

Increases in machine performance are bound to level off, however, present information indicates that a significant rate of improvement in future machines can be anticipated for some time. Promising new technologies under serious study at this time include magnetic thin films, superconducting thin films, tunnel diodes, and microwaves. While any or all of these technologies may make an impact on the market in the next ten years, magnetic thin films have been the longest under study in numerous laboratories throughout the world and appear to be closest to widespread commercial utilization.

The primary application for magnetic thin films is in the computer memory or storage wherein information bit rate and memory capacity are two extremely important factors which determine the efficiency of the computer. The continuous demand to increase these factors, combined with the simultaneous desire to reduce costs, resulted in the search for suitable phenomena in solid state physics. In magnetics, on which present day computers rely so strongly, great hopes are placed on the excellent switching and storage properties of thin magnetic films, which may allow the limitations of existing magnetic materials to be pushed back by several orders of magnitude.

Ever since thin film memories were first proposed by Blois and Conger in 1955, it has been recognized that such memories possess a number of inherent advantages. In addition to high speed operation, low current requirements and small energy dissipation as set forth above they are capable of being effectively cooled, fabricated in entire arrays at once instead of individual bits having a high density of memory elements, and utilizing simple printed wiring techniques instead of threading wires through individual bits as it done for ferrite cores.

The operation of a conventional thin magnetic film memory array is similar in principle to that of a random access ferrite toroid memory. In a ferrite memory (consisting of thousands of small ferromagnetic donuts or toroids), each toroid stores information by the sense of its magnetization. In standard parlance a "one" may be said to be stored when the toroid is magnetized clockwise while counter-clockwise magnetization may correspond a "zero."

By using suitable coding techniques, it is possible to represent a wide range of information by the pattern of "ones" and "zeros" so stored in the memory array.

In a thin film array, the toroids are replaced by an array of thin metallic spots which typically are made of permalloy (a ferromagnetic alloy of nickel and iron) and may be rectangular with dimensions of less than 0.04 inch on a side and 4 millionths of an inch thick. These metallic spots are in fact thinner than the paint on an automobile and must be supported in the memory by being placed on a substrate plane such as glass or mica. Usually these spots are evaporated onto the substrate in an evacuated chamber containing a heated crucible of permalloy. As the crucible is heated above the melting point of the metal, the metal evaporates from the crucible and deposits in a thin film over all the walls of the evaporation chamber as well as on the surface of the substrate which is placed in the chamber. Films are generally deposited in a magnetic field in order to achieve two oppositely directed stable directions for the magnetization.

If these directions correspond to a magnetization to the right (north poles to the right and south poles to the left) or magnetization to the left, then a "one" or "zero" may be designated by the right or left handed sense of the magnetization and the magnetic field induced by electric current in a nearby wire or wires can be used to change the direction of magnetization from a "one" to a "zero" or vice versa.

The films so produced exhibit uniaxial magnetic anisotropy. By uniaxial magnetic anisotropy is meant that tendency of the magnetization all over the film to align in one preferred distinct direction, or else in a direction antiparallel to this. This preferred direction is termed "easy direction," and that perpendicular to the easy direction is termed the "hard direction." Uniaxial anisotropy is generated, for example, by the evaporation of permalloy material, preferably of the composition of 80% nickel and 20% iron, onto a heated substrate in the presence of a static magnetic field parallel to the plane of the substrate. During this process, the magnetic field induces the easy direction of magnetization. The physical reasons for the occurrence of induced uniaxial anisotropy are still under investigation. The results of such a fabrication is that the film, without any external fields, behaves similar to a single domain, i.e., all magnetization vectors point in the same direction. It should be noted, at this point, that anisotropic differs from isotropic material in that isotropic material exhibits the same property or properties in every direction whereas anisotropic films do not exhibit the isotropic phenomena, that is, isotropic films or mediums exhibit no preferred direction of magnetization, while an anisotropic medium or film exhibits some preferred direction. Where, as discussed above, the film is said to exhibit uniaxial anisotropic characteristics, such a medium then exhibits a single axis or antiparallel preferred direction, along which a particular phenomena takes place, that is opposite remanent orientation states for magnetic flux. It is this characteristic of thin film elements made of magnetic material which is utilized to store binary information, in that the oppositely oriented stable remanent directions of flux are utilized to designate the different binary values 0 and 1.

A. V. Pohm, et al. suggested the use of plane magnetic thin film elements exhibiting uniaxial anisotropy in an article entitled "A Compact Coincident-Current Memory," Proceedings of the Eastern Joint Computer Conference, New York, N.Y., December 1956, pp. 120–124, while L. P. Hunter suggested the use of toroidal thin film elements exhibiting uniaxial anisotropy for a similar coincident-current memory in a copending application Serial No. 614,654, now U.S. Patent No. 3,093,818, assigned to the assignee of this application. Others, such as Eric E. Bittmann, in an article entitled "Using Thin Films in High-Speed Memories," appearing in Electronics, June 5, 1959; S. Methfessel et al., in an article entitled "Thin Magnetic Films," UNESCO, Proceedings of the International Conference on Information Processing, Paris, June 15–20, 1959; and, K. Raffel et al. in an article entitled "A Computer Using Magnetic Films," UNESCO, Proceedings of the International Conference on Information Processing, Paris, June 15–20, 1959, also proposed the use of such uniaxial anisotropic magnetic thin film elements in coincident-current memories.

All of the magnetic memories set forth in the above paragraph and in fact most of the magnetic memory devices presently known in the art require coincident-current pulsing of a given memory element in a matrix to either write information into the element or read information out of the element. Such storage devices requiring time coincident pulsing suffer from the obvious disadvantage in that the word and bit pulses must be very carefully synchronized, within close tolerances, to occur simultaneously. Thus, complicated and expensive synchronization systems are needed to operate such storage matrices. It has long been a desired in the industry to develop a noncoincident current switching magnetic storage device. One such device is disclosed and described in copending application Serial No. 102,184, now U.S. Patent No. 3,071,756, filed April 11, 1961, of E. W. Pugh, entitled "Magnetic Memory." Application Serial No. 102,184 discloses a thin magnetic film having a biaxial anisotropic characteristic whereby the noncoincident switching is permitted through proper use of the biaxial characteristic of this film. Although the magnetic thin film of the above application performs satisfactorily in the manner set forth it has been found that the production of a single thin film biaxial element is quite involved and expensive.

It has now been found that a magnetic storage element having a biaxial anisotropic characteristic can be formed by making a sandwich of two thin films each having a uniaxial anisotropic characteristic said films being oriented so that their easy axes are perpendicular to one another and magnetically coupled together so as to give an equivalent biaxial anisotropic characteristic.

It is accordingly a primary object of the present invention to provide a magnetic memory element operable by noncoincident current selection techniques.

It is another object of the invention to provide such a magnetic memory element wherein the element exhibits a biaxial anisotropic characteristic.

Still another object of the invention is to provide such a magnetic memory element wherein the biaxial anisotropic characteristic is achieved by utilizing a sandwich of at least two separate films each having a uniaxial anisotropic characteristic.

A further object of this invention is to provide a noncoincident current selection magnetic memory matrix employing a plurality of magnetic thin film sandwich elements each having an equivalent biaxial anisotropic characteristic.

The foregoing and other objects, features and advantages of the invention will be apparent from the following more particular description of a preferred embodiment of the invention, as illustrated in the accompanying drawings.

In the drawings:

FIGURE 1 illustrates a noncoincident current selection magnetic memory according to a preferred embodiment of this invention.

Figure 2A:
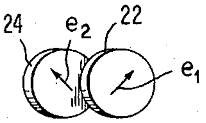

FIGURE 2*a* is an exploded view of a magnetic thin film sandwich constructed according to the teachings of the present invention showing the relative directions of the easy axes of each film.

Figure 2B:
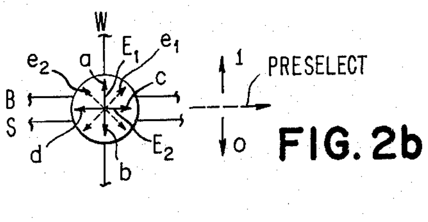

FIGURE 2*b* illustrates the single thin magnetic film sandwich storage element shown in FIGURE 1 and also illustrates the easy axes of each of the two films as well as the equivalent biaxial characteristic of the composite storage element.

Figure 3:
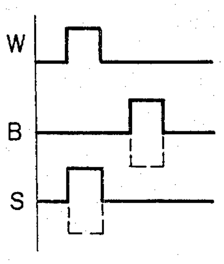

FIGURE 3 illustrates a pulse program for operation of the memory array of FIGURE 1.

Figure 4A:
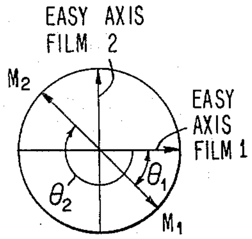

FIGURE 4*a* is a magnetic moment vector diagram of a biaxial magnetic film sandwich according to the invention having strong magnetic coupling between the films.

Figure 4B:
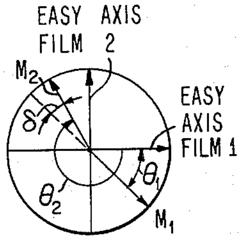

FIGURE 4*b* is a magnetic moment vector diagram of a biaxial magnetic film sandwich according to the invention having intermediate magnetic coupling between the films.

Figure 4C:
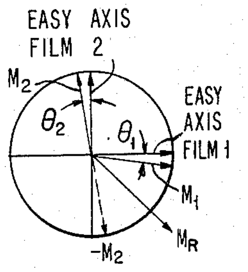

FIGURE 4*c* is a magnetic moment vector diagram of a biaxial magnetic film sandwich according to the invention having weak magnetic coupling between the films.

The objects of this invention are accomplished in general by a magnetic storage element having a biaxial anisotropic characteristic comprising two thin magnetic films forming a sandwich having bit drive, word drive and sense windings passing between the two films and wherein each film possesses a uniaxial magnetic anisotropic characteristic and said two films are so oriented that their easy axes are substantially perpendicular to one another.

Magnetic thin film elements exhibiting a biaxial anisotropic characteristic differ from a uniaxial anisotropic element in that they exhibit two transverse axes of easy magnetization. Stated differently, such a magnetic element exhibits a biaxial anisotropic characteristic defining a first set of opposite remanent stable states of flux orientation along a first easy axis of magnetization and defines an opposite set of stable remanent states of flux orientation along a second easy axis of magnetization, angularly displaced from this first axis, preferably at 90°. The opposite remanent stable states of flux orientation along the first easy axis of magnetization are employed to designate the two binary values of "zero" and "one," while either of the opposite remanent stable states of flux orientation along the second easy axis of flux orientation is employed as an auxiliary stable state. Thus a biaxial anisotropic element may be said to possess four-fold symmetry since, depending upon the magnetic orientations, any one of four equivalent magnetic orientations may be assumed by the element depending upon the manner in which it has been pulsed.

The biaxial anisotropic magnetic storage element is switched to an intermediate or pre-select stable state along the second easy axis to read out the information retained therein, and thereafter, in non-time coincidence with the switching of same element to the pre-select stable state, the element is switched to a predetermined one of its stable states of orientation along the first easy axis for writing information therein. Thus, a current pulse along the word line not only reads the word out but also sets every bit along the word line in an intermediate stable state which is always the same so that the positive or negative current pulses along the bit line at any arbitrary time later can be used to write "ones" or "zeros" into the word bits. The field applied to the element for reading is directed transverse with respect to the first easy axis of the element, and the field applied for writing is applied parallel to the first easy axis of the element. With the biaxial magnetic thin film sandwich utilized in the present invention to obtain the biaxial equivalent construction the easy axes of the composite element are not aligned with the individual easy axes of each film but are at about 45° therewith, as will be discussed subsequently. The various bit and word drive lines as well as the sense lines are aligned with the resultant easy axes of the composite element. It should also be noted that the magnitude of the field applied to the element for writing a "zero" or a "one" is sufficient to switch the element from a pre-select oriented stable state to either one of the binary valued oriented stable states, but it is insufficient to switch the element from one binary value stable state to another.

As will be apparent from the above discussion, the term biaxial thin magnetic film sandwich as used herein refers to such a sandwich wherein each of two films possess uniaxial magnetic anisotropy and wherein the easy axes of the two films are disposed at substantially right angles to one another and coupling between the films is such as to give an equivalent biaxial anisotropic characteristic.

Referring more specifically to FIGURE 1, there is shown a small magnetic storage matrix constructed utilizing a plurality of biaxial magnetic film sandwich storage elements 20 therein in a word organized noncoincident pulse sequence driving arrangement. The memory is arranged in word columns and bit rows wherein lines $W_1$ through $W_3$ provide the word drive pulses for the storage element and lines $B_1$ through $B_3$ provide the bit drive pulses. The word and bit drive lines are driven respectively by a word address and bit address means 10 and 12 and the lines are grounded at their terminals ends. Sense windings $S_1$ through $S_3$ are likewise provided to couple readout pulses to their respective loads 14, 16 and 18. The biaxial magnetic film sandwich storage elements 20 are located at the various intersections of the word, bit and sense windings and are so disposed relative to these windings that one of the resultant easy axes of the element is parallel to the bit and sense winding and the other parallel to the word winding.

The elements 20 exhibit a first easy axis of magnetization $E_1$, and angularly displaced therefrom, preferably by 90°, a second easy axis of magnetization $E_2$.

It should be understood that while the operation of the biaxial magnetic film sandwich of the present invention is the same as that of a single film having a biaxial anisotropic characteristic, the internal switching of the instant device is quite different. A single film biaxial element actually has four stable states of alignment of the magnetic particles comprising same while the biaxial sandwich of the present invention has instead four stable states of coupled magnetic moments which will be described subsequently. The net result of both devices is the same since both have four-fold magnetic field stability, one difference being that some of the biaxial magnetic film sandwiches of the present invention develop their stable states and resultant easy axes at an angle of 45° with respect to the easy axes of the individual films.

FIGURE 2*a* shows an exploded view of a biaxial magnetic film sandwich storage element composed of the two individual uniaxially anisotropic films 21 and 24 having individual easy axes $e_1$ and $e_2$.

Referring now to FIGURE 2*b*, an orientation along the easy axis $E_1$ and the "*a*" direction will represent a "one" (1) stored in the storage element whereas orientation in the "*b*" direction will designate "zero" (0). Orientation along the $E_2$ axis in the "*d*" direction represents a preselect.

FIGURE 3 shows a typical pulse program for energization of the bit and word address lines W and B for operation of the storage matrix of FIGURE 1. Referring to the FIGURES 1, 2*a* and 2*b*, assume information is already stored in the memory and each of the elements 20 is positioned in the memory so that the axis $E_1$ is in alignment with word address drive lines $W_1$–$W_3$, while the axis $E_2$ is in alignment with the bit address drive lines $B_1$–$B_3$. When an information word is to be stored in a particular address location, the word information stored in the particular address location is first read out and then the desired word information to be stored is written into this location. To accomplish this, a selected one of the word drive lines $W_1$–$W_3$ is energized as shown in FIGURE 3 to orient the magnetization of each of the elements 20 coupled thereby in a given direction along the axis $E_2$, each element now being established in the pre-select or pre-write remanent state. Thereafter, all the bit row drive lines $B_1$–$B_3$ are energized as shown in FIGURE 3 by either a positive or negative polarity impulse depending on whether a "one" (1) or "zero" (0) is to be written into the memory. Energization of a drive line B by a positive polarity impulse switches an element 20 in the pre-select oriented state to orientation along the axis $E_1$ defining the 1 stable state, while energization of a drive line B with a negative polarity impulse switches an element 20 in the pre-select orientation state to orientation along the axis $E_1$ defining the 0 stable state. Thus, by applying a pulse to the word drive line, the information stored in the element is read out at the same time the element is placed in the pre-select or pre-write condition. If desired, the storage matrix could be cycled so that all of the elements are switched to the "zero" state before starting the writing cycle. In practice, the output circuit of the sense windings would be gated so that an output signal is receivable only when desired, i.e., during the readout cycle.

The physical operation of the biaxial magnetic thin film sandwich storage element is thus much the same as that of single film biaxial storage elements; however, the construction of the element itself is quite different, as are the principles of operation. The following mathematical derivation of a biaxial element constructed of two thin films each possessing uniaxial anisotropy is presented as a criteria for making an operable magnetic thin film sandwich having a resultant biaxial anisotropy characteristic.

In describing the biaxial anisotropic resultant effect of the magnetic thin film sandwich of the present invention, three different possible conditions or modes of magnetic flux linkage between the uniaxial anisotropic individual films must be considered. These are the conditions of I—strong coupling, II—intermediate to strong coupling, and III—weak coupling. These three possible conditions will be discussed separately and the manner in which they give rise to a resultant biaxial equivalent configuration explained.

In all three situations it should be understood that the individual magnetic moments of each of the two thin films making up the sandwich has an associated magnetic field which exerts a rotational effect upon that of the other film due to the flux linkage between the films. That is, each film tries to line up the individual magnetic particles of the other film to lie in a direction antiparallel to that of itself. For the condition of very strong coupling this antiparallel alignment is assumed to be effectively complete. For the condition of intermediate to strong coupling the angle between the magnetic moments of the two films will be a little less than the 180° for the condition of complete antiparallelism just set forth. The degree or amount of deviation from the complete antiparallelism of the first case is denoted by the angle $\delta$ in FIG. 4*b*.

Anisotropic magnetic materials are defined by their energy equations. The energy for the magnetic film sandwich of the present invention comprising two uniaxial, anisotropic films each of unit volume having their easy axes at right angles to one another is described by the following equation:

$$E=N^1M^2\cos(\theta_1\theta_2)-K_1\cos 2\theta_1+K_2\cos 4\theta_1+K_1\cos 2\theta_{22}+K_2\cos 4\theta_2 \qquad (1)$$

In the above equation N′ is the coefficient of magnetic coupling between the films $$\left(N'\cong 4\pi\frac{T}{D}\right)$$

T=thickness of film, D=diameter, M is the magnetic moment per unit volume and $\theta_1$ and $\theta_2$ are the angles defined by the magnetic moments of film 1 and film 2 respectively with a common reference axis and $K_1$ and $K_2$ are anisotropy constants. These constants represent an inherent property of the magneic material as fabricated or a combination of inherent and shape effects ("shape anisotropy") which may arise if the film is not circular in form. For practical purposes anisotropy constants of higher order than those used are assumed to be negligible and are therefore not set forth or discussed with reference to the present invention although they do theoretically exist.

For the first case set forth above and illustrated in FIG. 4a where there is extremely strong coupling between the films 1 and 2, N′ has an extremely large value and quantity $N'M^2$ is much greater than $K_1$, and due to the extremely strong coupling $\theta_1$ is equal to $\theta_2$ plus $\pi$. This is illustrated in FIG. 4a wherein $M_1$ and $M_2$ are substantially antiparallel. In this situation the energy Equation 1 becomes:

$$E=2K_2 \cos 4\theta_a+\text{constant} \quad (2)$$

As long as the driving currents pass between the films the combination acts like a single film having the above energy equation and when this equation is solved for its minimum values they will be seen to occur at 4 different angular values for the angle $\theta$. This minimum value for the energy equation represents a stable orientation of the composite magnetic film sandwich and since a minimum occurs at 4 values the film has 4 stable orientations. These occur at $$\theta=\theta_1=\theta_2+\pi=0, \frac{\pi}{2}, \pi, \frac{3\pi}{2}$$

for situations in which $K_2$ is less than 0 or a negative value. Thus for this condition the 4 stable states will lie at 0°, 90°, 180° and 270°. Where K is greater than 0 or positive value the stable orientations are at $$\theta=\frac{\pi}{4}, \frac{3\pi}{4}, \frac{5\pi}{4}, \text{ and } \frac{7\pi}{4}$$

or 45°, 135°, 225° and 315°. A brief explanation of the strong coupling mode is as follows. A magnetic film may be regarded as a composite of uniaxial (represented by $K_1$) and biaxial (represented by $K_2$) properties. In the strong coupling mode the uniaxial effect of one film just cancels the uniaxial effect of the second film. The biaxial effects do not cancel so that the device has biaxial anisotropy.

The extremely strong coupling required for this condition of operation may be obtained by using materials such as permalloy and having a spacing S between the films which is far less than the diameter. Practice indicates that keeping S small minimizes undesirable self-demagnetization of the films due to large, inhomogenous, depolarizing magnetic fields at the film edges. A suitable value of S as small as $3\times10^{-3}$ cm. may be obtained by evaporating striplines $10^{-4}$ cm. thick on a mylar film and pressing between magnetic films evaporated on a glass substrate. The other parameters of the device must satisfy the inequality $4\pi TM^2>D|K_1|$ according to the analysis given above. In addition, the ratio $T/D$ should be small to minimize self-demagnetization. A satisfactory set of parameters is $T=2\times10^{-4}$ cm., $M-10^3$ gauss, $D=0.1$ cm., $K_1=10^3$ erg/cc. and $K_2=0.2\times10^3$ erg/cc.

In mode I the effective biaxial anisotropy, which governs the amount of current required to switch the element, is determined by the value of $K_2$. Since it is difficult in practice to obtain a sufficient value of $K_2$ without introducing disadvantageous effects such as low magnetic remanence, we consider a condition II of biaxial operation effective even if $K_2=0$.

In condition II of operation, illustrated by FIG. 4b, the magnetic coupling between the films is strong but not quite strong enough to cause complete alignment or anti-parallelism of the magnetic moments $M_1$ and $M_2$ of films 1 and 2 respectively. It will be seen that the misalignment gives rise to effective biaxially. In this case the magnetic moments are misaligned by an amount $\delta$. In this case $$\theta_2=\theta_1+\pi+\delta \quad (3)$$

$$E=-N'M^2 \cos \delta-K_1 \cos 2(\theta_2+\delta)+K_1 \cos 2\theta_2 \quad (4)$$

For this configuration it is assumed that $K_2$ is negligibly small, that $K_1$ is much less than $N'M^2$, and that the coupling is such that $\delta$ varies between about ±30°, depending on the values of the other parameters appearing in Equation 4.

If we substitute for $\delta$ the value which minimizes E for arbitrary $\theta_2$ Equation 1 above reduces in good approximation to:

$$E=\text{constant}+\frac{K_1^2}{2N'M_2} \cos 4\theta_2 \quad (5)$$

Solving this equation for minimum E or stable states the result is that there are four easy directions at an angle of 45° to the original easy axes of the individual films. Thus, the four stable orientations of the element with the intermediate coupling are at 45°, 135°, 225° and 315°.

Films having such intermediate coupling would be constructed by the same method as in mode I described above. However the parameters must be appropriate to provide a suitable value to the effective biaxial anisotropy of Equation 5. For example, to attain a biaxial coefficient of $K_1^2/2N'M^2=0.2\times10^3$ erg/cc., the following set would be satisfactory:

$T=10^{-4}$ cm.,
$M=10^3$ gauss,
$D=0.1$ cm.,
$K_1=2\times10^3$ erg/cc.,
$K_2=0$ The mode of operation of the embodiment (mode III) of FIG. 4c is somewhat different than that for FIGS. 4a and 4b. In this embodiment the magnetic coupling between the two uniaxial films is appreciable but is sufficiently weak that $M_1$ and $M_2$ are nearly perpendicular ($N'M^2<|K_1|$, $N'M^2<|K_2|$) when there is no applied field. There is some slight magnetic coupling as indicated in this case by the angles $\theta_1$ and $\theta_2$ which respectively cause some deviation of the magnetic moment vectors $M_1$ and $M_2$ from the individual easy axes $e_1$ and $e_2$. Herein the biaxial effect is obtained due to the reference vector indicted in drawing 4c as $M_r$ resulting from the 2 magnetic vectors $M_1$ and $-M_2$ which set up respective magnetic fields.

$$M_r=M_1-M_2 \text{ (vectorial equation)}$$

These fields couple together in the space between the two films to form the vector $M_r$ which has four stable states of orientation corresponding to the four possible combinations of orientations of vectors $M_1$ and $M_2$ close to their respective easy axes. It may be demonstrated that this embodiment can be caused to function in the nature of a biaxial element by applying the switching or rotating fields along the direction of stable orientation of $M_r$ such that the individual films can be made to switch from one position to another. And further that by suitably choosing the magnetizing or switching fields H that the device will perform a preselect function. For example, if it is desired to rotate the vector $M_r$ of FIG. 4c 90° in a counterclockwise direction magnetizing fields $H_1$, $H_2$ in films 1 and 2 respectively would be applied to the device by a current passing between the films in a direction parallel to the resultant easy axes, whereby the vector $M_2$ would be caused to rotate about 180° and $M_1$ would rotate only a small amount. Thus by applying suitable pulses to the device of FIG. 4c the two states of storage for a zero (0) or a one (1) or a preselect state may be selected. The preselection ability of this particular embodiment is due to the fact that when a magnetizing current of magnitudes barely sufficient to cause the 90° rotation just described but so disposed as to rotate $M_r$ from one storage condition to another at 180° neither of the films will switch because the torques due to mutual coupling fields of the films oppose the directions of attempted rotation.

Thus it may be seen that with the embodiment of FIG. 4c although a resultant biaxial energy equation cannot easily be given, the device will function in the same manner as those of FIGS. 4a and 4b. The biaxial element thus exhibits the preselect feature by virtue of the resultant magnetic vectors formed between the two films and the slight degree of coupling which prevents unwanted 180° switching of the element.

In referring to the resultant easy axes of the biaxial magnetic film sandwich of the present invention it is understood that the easy axes referred to are the resultant easy axes of the film sandwich. For a magnetic coupling of the films as set forth for case I these axes may be either along the original easy axes of the individual films as for the condition where $K_2$ has a negative value or displaced 45° therefrom as when $K_2$ has a positive value. For case II and III it is to be understood that the resultant easy axes of the magnetic film sandwich element are at an angle of 45° with respect to the individual axes of the individual films.

It will be noted that modes I, II, and III are distinguished for descriptive purposes only. In practice it is possible to obtain operation intermediate to I and II or intermediate to II and III. The actual mode used would be determined by the magnetic material available and circuit characteristics desired. The mathematical formulas given are approximate and give rough guidance to the parameters required.

The actual switching of the biaxial magnetic film sandwich storage element of the present invention is substantially the same as that for the single film biaxial element set out in copending application Serial No. 102,184 set forth above.

Switching of the biaxial elements 20 shown in the FIGS. 2*a* and 2*b*, respectively, from one stable state to another along the same easy axis, for example rotational switching from the 0 state along the axis $E_1$ to the 1 state, a minimum field must be applied along this axis. This minimum field is dependent upon the anisotropy constants of the element and a saturation magnetization constant for the material of the element. A field applied by a B bit drive line will hereinafter be referred to as $H_B$, and the field which must be applied by any one of the B bit drive lines of FIG. 1 in order to completely rotate the element from one binary storage state to another is given by the relationship:

$$H_{180°}=\frac{8K}{M}$$

where $H_{180°}$ is the field necessary for rotational switching, M is the saturation magnetization constant for the material and K is $K_2$ of Formula 1 for case I and $$K=K_1^2/2N'M^2$$

for case II. For case III $H_{180°}$ is of the order of magnitude of the uniaxial threshold, $4K_1/M$. It has been found that for cases I and II, the field which must be applied to cause rotation of the magnetization by 90°, or a preselect, such as performed by any one of the word address lines $W_1$–$W_3$ as described above, the relationship is given in the formula:

$$H_{90°}=(0.27)\,\frac{8K}{M}$$

For case III, $H_{90°}$ is governed by the inequality $.27H_{180°}<H_{90°}<H_{180°}$, its precise value depending on the degree of coupling.

Thus a field $H_w$ applied by the word address lines $W_1$–$W_3$ satisfies the inequality $H_{90°}<H_w<H_{180°}$ while similarly, the field $H_x$ applied by the bit address lines $B_1$–$B_3$ satisfies the same inequality for the memory of FIG. 1.

It has also been found that equivalent biaxial magnetic film sandwich elements may be fabricated which, while exhibiting biaxial anisotropic characteristics, one of the easy axes is more pronounced than the other, or in other terms, one easy axis is more stable for remanent magnetization than the other. Such elements are termed "complex" biaxial anisotropic elements. However, a certain amount of such inbalance can be tolerated and the element will still operate in the biaxial manner set forth. In practicing the present invention substantially identical biaxial symmetry may be obtained by making the films by substantially identical processes.

In any event, a minimum field must be applied to a simple or complex biaxial anistropic element for a 90° rotational switch as has been specified above. If a field of too large a magnitude were employed for switching any one biaxial element described above from orientation along one axis to orientation along another axis, such fields would cause registration of erroneous information in the memory of FIG. 1. For example, consider the memory of FIG. 1 where the biaxial magnetic film sandwich elements 20 are "simple," as described above, a selected word is addressed and the particular word address drive line $W_1$–$W_3$ is energized to rotate all the elements 20 coupled thereby to a preselect remanent state, causing orientation along the easy axis $E_2$. Thereafter, all of the bit drive lines $B_1$–$B_3$ are energized by positive impulses to establish the different elements 20 in the 0 or 1 stable state, orienting the magnetization of the elements 20 along the axis $E_1$. Assume that the field $H_B$ applied to the elements 20 is greater than $H_{90°}$. A similar field is applied to all the remaining elements 20 in the matrix. This field must be less than $H_{180°}$ since any element 20 in other nonselected words oriented antiparallel to the field $H_x$ would switch to an opposite stable state of orientation along its axis $E_1$. It is well recognized that in most anisotropic magnetic elements, the coercive force threshold for wall motion switching, as distinguished from rotational switching, is less than that of rotational switching. Thus, where the wall motion threshold of the element is $H_c$, as seen along the easy axis of the element, $H_c<H_{180°}$. Therefore, even though the field $H_B$ applied to all the elements of a row is less than the rotational switching threshold $H_{180°}$ this field must also be less than the coercive force threshold for wall motion switching $H_c$ or else elements having their magnetization directed antiparallel to the applied field $H_B$ will switch by wall motion. Therefore, a limitation of the maximum field $H_B$ which may be applied in the memory of FIG. 1, is that this field must be less than the wall motion threshold $H_c$ and less than the rotational switching threshold $H_{180°}$ of the element along the axis $E_1$. That is $H_c>H_B<H_{180°}$.

It will be observed that a particular advantage of the present invention is to make the restriction $H_B<H_c$ easier to fulfill because the magnetic coupling tends to counteract self-demagnetization of the individual films and thus to increase the $H_c$ effective in this consideration.

The limitation of the applied field $H_B$ having been described above, consider now the field $H_w$ applied by the word address drive lines $W_1$–$W_3$. During application of the field $H_w$ to all the elements 20 in a selected word, these elements rotationally switch to orientation along the axis $E_2$. At this time, the information stored in the different elements is read out on the different sense lines $S_1$–$S_3$ and applied to the different loads 14, 16 and 18, respectively. The polarity of the impulse induced on the different sense lines $S_1$–$S_3$, defines the binary information previously stored in a particular bit location. For example, if an element 20 is storing a binary 0 when this element is switched to orientation along the axis $E_2$, a negative impulse is induced on the sense winding S coupled thereto as indicated in FIG. 3. Conversely, if an element 20 is storing a binary 1, when this element is switched to a preselected orientation stable state along the axis $E_2$, a positive impulse is induced on the sense line S coupled thereto. If the field $H_w$ applied to the element 20 is large, then a voltage of large magnitude is induced on the sense windings $S_1$–$S_3$ whose polarity is either positive or negative depending upon the previous storage history of the particular elements. Each of the sense lines $S_1$–$S_3$ also couple all the remaining bits 20 in the memory in such a manner as to apply a field $H_S$ to the remaining elements 20. If the field $H_S$ applied to any one of the remaining elements 20 in the memory of FIG. 1 is large enough, then any element coupled which is not being read out and oriented antiparallel to this applied field will switch to an opposite information storage state. As discussed above, therefore, the field $H_S$ to any of the remaining elements by readout of a selected word must be less than the coercive force threshold $H_c$ of the material and less than the rotational switching threshold $H_{180^\circ}$ of the material. Therefore, in order to avoid deleterious effects, the field $H_W$ should be held to a predetermined maximum. This maximum is determined by the coupling characteristics of the sense lines $S_1$–$S_3$ to the different elements 20, the length of line S between the different storage elements 20 and stray field coupling, if any, between elements.

The major advantage of magnetic thin film memory elements exhibiting a biaxial anisotropic characteristic is realized in a two dimensional non-coincident pulse selection memory as shown in FIG. 1. Non-destructive readout of such a memory may be achieved by applying a drive to any selected word drive line which applies a field directed along the axis $E_2$ which is of magnitude to insure some rotational switching and magnetic field coupling with the sense winding but small enough to insure rotation of the magnetization back to the initial low energy stable state rather than to be preselect orientation direction.

While the invention has been particulary shown and described with reference to preferred embodiments thereof, it will be understood by those skilled in the art that the foregoing and other changes in form and details may be made therein without departing from the spirit and scope of the invention.

What is claimed is:

1. A thin magnetic film sandwich storage element having an equivalent biaxial anisotropic characteristic, said element comprising:

(*a*) two substantially identical thin magnetic films, each having a uniaxial anisotropic characteristic in parallel spaced relationship and so oriented that their respective easy axes lie at right angles, (*b*) current conductors passing between the two films oriented at right angles to each other and parallel to resultant easy axes of the element.

2. A thin magnetic film sandwich storage element having an equivalent biaxial anisotropic characteristic, said element comprising:

(*a*) two substantially identical thin magnetic films, each having a uniaxial anisotropic characteristic in parallel spaced relationship and so oriented that their respective easy axes lie at right angles, each of said films acting substantially as single magnetic domains, (*b*) current conductors passing between the two films oriented at right angles to each other and parallel to a resultant easy axis of the element and wherein the magnetic forces exerted by one film on the other are substantially equal.

3. Apparatus for storing binary information comprising:

(*a*) two substantially identical parallel magnetic thin films each exhibiting uniaxial magnetic anisotropy and each acting substantially as a single magnetic domain coupled magnetically to provide a resultant biaxial anisotropic characteristic defining opposite remanent stable states of flux orientation along a first resultant easy axis of magnetization and angularly displaced approximately 90° from said first resultant easy axis opposite remanent stable states of flux orientation along a second resultant easy axis of magnetization, (*b*) first means including a first current conductor passing between the films for applying a field of predetermined magnitude directed along said second resultant easy axis to switch said element from orientation along said first resultant easy axis to a stable oriented state along said second resultant easy axis and (*c*) means including a second current conductor passing between the films at right angles to the first conductor operative in non-coincident time relationship with said first means for thereafter applying a field of predetermined magnitude directed along said first resultant easy axis to switch said element from orientation along said second easy axis to orientation along said first resultant easy axis.

4. An information storage apparatus as set forth in claim 2 wherein the magnetic properties of the two films obey the equality $$M_1V_1=M_2V_2$$

where $M_1$=the magnetic moment per unit volume of the first film $M_2$=the magnetic moment per unit volume of the second film $V_1$=volume of the first film $V_2$=volume of the second film.

5. An information storage matrix comprising:

(*a*) a plurality of magnetic storage elements arranged in columns and rows, each said element comprising (*b*) two substantially identical magnetic thin films each of which has a uniaxial anisotropic characteristic defining an easy axis, said films being disposed in parallel planes with their respective easy axes at right angles, the magnetic coupling between said films providing four stable states of magnetic flux orientation between said films which states define a first resultant easy axis and a second resultant easy axis in quadrature therewith, (*c*) a plurality of column conductors passing between the films of each storage element coupling all the elements in different columns, (*d*) a plurality of row conductors passing between the films of each storage element coupling all the elements in different rows, (*e*) first means including a selected column conductor for applying a minimum field along the second resultant easy axis of all the elements in a selected column sufficient to switch the magnetization of said elements in the selected column from orientation along the first resultant easy axis to remanent orientation along said second resultant easy axis, and (*f*) second means including all said row conductors operative in non-coincident time relationship with said first means for thereafter applying a minimum field to all the elements in all said rows directed along the first resultant easy axis thereof having a magnitude less than the coercive force thresholds $H_c$ and $H_{180^\circ}$ of said elements but sufficient to switch all the elements in said selected column from orientation along said second resultant easy axis to a selected stable oriented state along said first resultant easy axis.

6. A magnetic memory storage element for storing binary information comprising:

(*a*) two substantially identical magnetic thin films each exhibiting uniaxial magnetic anisotropy and each of which acts substantially like a single magnetic domain said films being parallel to each other and sufficiently closely spaced to provide magnetic coupling between the films which imparts a biaxial anisotropic characteristic to the element defining opposite remanent stable states of flux orientation along a first resultant easy axis of magnetization of the element and angularly displaced from said first easy axis, opposite remanent stable states of flux orientation along a second resultant easy axis of magnetization of the element, (*b*) first means including a first current conductor passing between the films for applying a field of predetermined magnitude directed along said second resultant easy axis to switch said element from orientation along said first resultant easy axis to a stable oriented state along said second easy axis and (c) means including a second current conductor passing between the films at right angles to the first conductor operative for applying a field of predetermined magnitude directed along said first resultant easy axis to switch said element from orientation along said second resultant easy axis to orientation along said first resultant easy axis.

7. A magnetic storage element as set forth in claim 6 wherein the magnetic coupling between the two films is strong and defines the resultant energy equation of the element as:

$$E=2K_2 \cos 4\theta_2+\text{constant}$$

where $\theta_2$=angle defined by the magnetic moment of one of the films with a reference axis $K_2$=the biaxial anisotropy constant of the films and wherein the individual magnetic moments of the two films are substantially antiparallel.

8. A magnetic storage element as set forth in claim 7 wherein the physical parameters of the element satisfy the inequality $$4\pi TM^2>DK_1$$

where $T$=thickness of the films $M$=magnetic moment per unit volume of the film $D$=the diameter of the film $K_1$=the unaxial magnetic anisotropy constant.

9. A magnetic storage element as set forth in claim 6 wherein the magnetic coupling between the two films is intermediate and defines the resultant energy equation of the element as:

$$E=\text{constant}+\frac{K_1}{2N'M_2} \cos 4\theta^2$$

where $N'$=coefficient of magnetic coupling between the films $M_2$=magnetic moment per unit volume of the films $K_1$=uniaxial anisotropy constant $\theta$=angle defined by the magnetic moment of one of the films and a reference axis.

10. A magnetic storage element as set forth in claim 9 wherein the angle of deviation from antiparallelism ($\delta$) between the magnetic moments is between $+30°$ and $-30°$.

11. A magnetic storage element as set forth in claim 6 wherein the magnetic coupling between the two films is relatively weak and wherein the individual magnetic moments of the two films add vectorially to produce the resultant biaxial anisotropic characteristic of the element.

12. An information storage matrix comprising:

(a) a plurality of magnetic storage elements arranged in columns and rows, each said element comprising two substantially identical magnetic thin films vapor deposited on separate non-magentic substrates and having a uniaxial anisotropic characteristic defining an easy axis, said films being disposed in parallel planes with their respective easy axes at right angles, the magentic coupling between said films providing four stable states of magnetic flux orientation between said films which define a first resultant easy axis and a second resultant easy axis in quadrature therewith, (b) a plurality of column conductors each coupling all the elements in different columns said conductors being vapor deposited on opposite sides of a suitable non-magnetic substrate which assembly is then sandwiched between the two films, (c) a plurality of row conductors each coupling all the elements in different rows, (d) first means including a selected column conductor for applying a minimum field along the second resultant easy axis of all the elements in a selected column sufficient to switch the magnetization of said elements in the selected column from orientation along the first resultant easy axis to remanent orientation along said second resultant easy axis, (e) and second means including all said row conductors operative to apply a minimum field to all the elements in all said rows directed along the first easy resultant axis thereof having a magnitude less than the coercive force thresholds $H_c$ and $H_{180°}$ of said elements but sufficient to switch all the elements in said selected column from orientation along said second resultant easy axis to a stable oriented state along said first resultant easy axis.

13. An information storage matrix as set forth in claim 12 wherein said first and second means for applying a field along the second and first resultant easy axes of the elements respectively comprise means for supplying a current pulse to said conductors to produce a field of about .27 $H_{180°}$ in said elements to rotate the elements 90° are provided the elements are previously oriented in a stable state 90° displaced from said energizing field.

14. A magnetic thin film binary information storage element suitable for non-coincident pulse operation which comprises:

(a) two substantially identical magnetic thin films each possessing uniaxial magnetic anisotropy defining an easy axis formed into a sandwich element such that their respective easy axes are perpendicular to each other, said films being magnetically coupled together to produce a resultant biaxial magnetic anisotropic effect in the element defining two resultant easy axes at right angles to each other, (b) two current conductors passing between the two films at right angles to each other and parallel to the resultant easy axes of the element and (c) means for selectively applying current pulses to said conductors for establishing the storage element in any one of four stable energy states of the element.

References Cited by the Examiner

UNITED STATES PATENTS 3,015,807 1/62 Pohm et al. ---------- 340—174

FOREIGN PATENTS 225,970 12/59 Australia.

IRVING L. SRAGOW, *Primary Examiner.*